G. W. AYRES.
VINE LIFTER.
APPLICATION FILED JULY 3, 1919.
1,339,840.
Patented May 11, 1920.
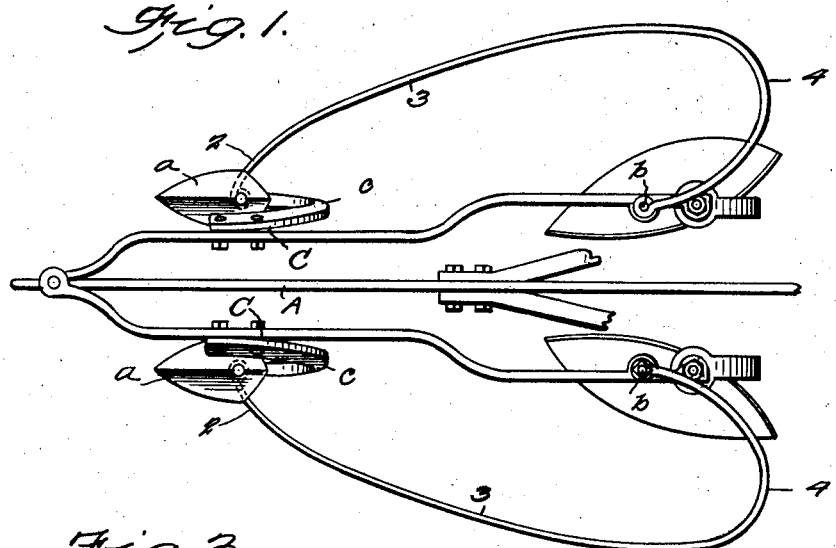
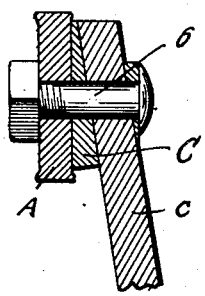
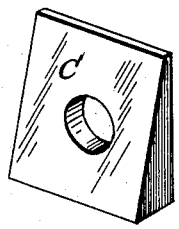
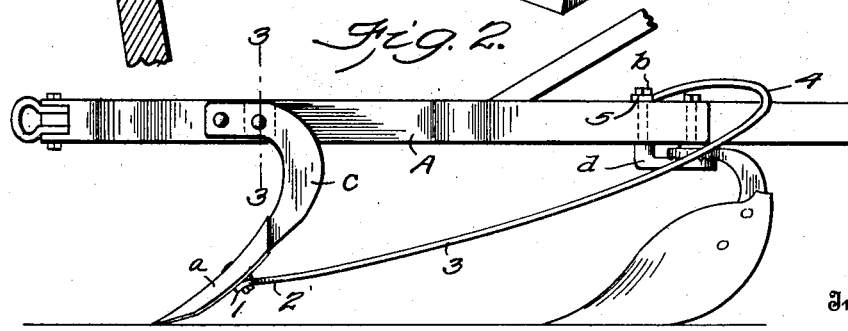
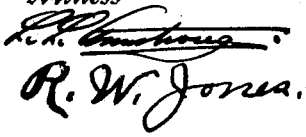
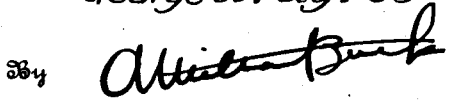

UNITED STATES PATENT OFFICE.

GEORGE W. AYRES, OF PUNGOTEAGUE, VIRGINIA.

VINE-LIFTER.

1,339,840.  Specification of Letters Patent.  Patented May 11, 1920.

Application filed July 3, 1919. Serial No. 308,595.

*To all whom it may concern:*

Be it known that I, GEORGE W. AYRES, a citizen of the United States, residing at Pungoteague, in the county of Accomac and State of Virginia, have invented certain new and useful Improvements in Vine-Lifters, of which the following is a specification.

This invention has relation to certain new and useful improvements in cultivators and comprises a vine lifter and turner arranged to be attached to a walking cultivator.

The object of my invention is to provide a vine lifter and turner noticeable because of its simplicity of construction, general utility and inexpensive nature, and so arranged that the same can be attached to any conventionally constructed walking cultivator.

The paramount object of the invention is to produce a generally-improved device of this class which will be exceedingly simple in construction, cheap of manufacture, and efficient in use and which will be better adapted to its intended purposes than any other device of the same class with which I am acquainted.

With these ends in view the invention consists in the novel construction, arrangement, and combination of parts hereinafter described, illustrated in the accompanying drawings, and particularly pointed out in the appended claim.

Referring to the accompanying drawings, forming a part of this specification, Figure 1 is a top view of my improved vine lifter and turner in its operative position applied to an ordinary walking cultivator.

Fig. 2 is a side elevation,

Fig. 3 is a section on line 3—3 of Fig. 2.

Fig. 4 is a perspective view of the adjusting wedge as used in my invention.

In the accompanying drawings I show at A a conventionally constructed cultivator equipped with my improved vine lifter and turner, which as shown is attached to the shovel holding bolt $a$ employed to hold the forward shovel in place at its forward end, while at its rear end the lifter is held to the bolt holding the shovel supporting bracket $b$.

The vine lifter and turner which is made of a single length of spring bar steel, is used in sets of two, as shown in Fig. 1, being what is known as a right hand and a left hand member. Each member at its forward end comprises a flat securing eye 1, from which each bar curves slightly outward and upward as shown at 2, thence continuing in a relatively straight portion 3, from which the bar is continued in the short recurved portion 4, which subtends in a plane at an acute angle to the axis of said straight portion, and ends in the flat securing eye 5, by means of which the lifter and turner is held at its rear end, in the manner shown in Fig. 1.

In order to properly hold the lifter and turner I tilt the forward shovel shank $c$ outward as indicated in Fig. 1. This is done so that the vines will be properly raised and turned and is accomplished by means of the wedges C interposed between the shovel shank $c$ and the cultivator frame in the manner shown in Fig. 3, where the supporting bolt 6 is shown as securing the shank $c$.

The operation of my device is very simple. In dragging the cultivator through the rows of sweet potatoes, peas or other heavily vining plants, the forward ends of the lifters and turners which drag below ground engage the vines which glide up the lifters and turners and are gradually raised and gently turned the lifters and turners also assisting in turning the weeds and grass in the rows under ground.

From the foregoing description, taken in connection with the accompanying drawings, the operation and advantages of my invention will be readily understood.

I have entered into a somewhat detailed description of the present and preferred embodiment of my invention in order to impart a definite understanding of the same. I do not desire, however, to be understood as restricting myself to the exact construction shown and described, as various changes or modifications may be made in the form, size, and minor details of construction without departing from the principles or sacrificing any of the advantages of this invention.

Having thus described my invention, what I claim, and desire to secure by Letters Patent, is:—

The combination with a cultivator, including a forward shovel holding bolt and rear bolt for holding a supporting bracket, of a vine lifter and turner made of bar metal, secured at its forward end to said forward bolt, from which the bar curves slightly upward and outward and thence continuing in a relatively straight portion which is directed upward and continued in a recurved portion which subtends in a plane at an acute angle to the axis of said straight portion and ending in a rear securing eye, secured at its upper portion to said bracket holding bolt, all arranged as shown.

In testimony whereof I affix my signature.

GEORGE W. AYRES.